Oct. 1, 1935.  M. WAGNER  2,015,700
MOTOR VEHICLE
Filed April 20, 1933
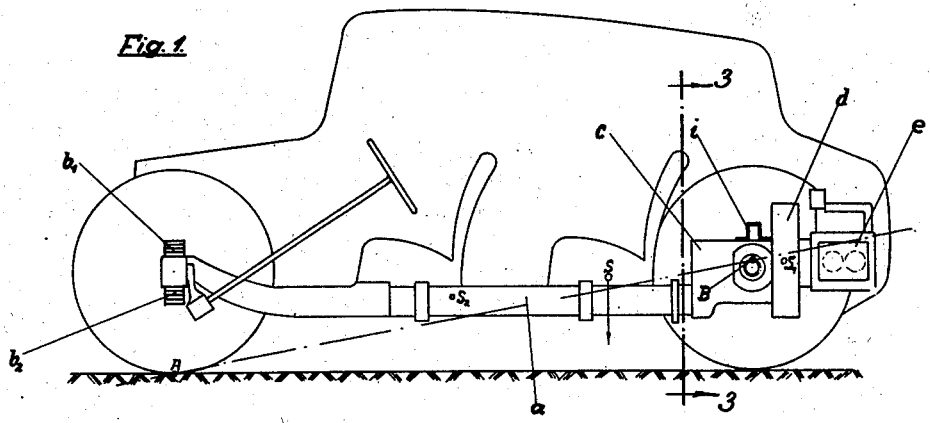
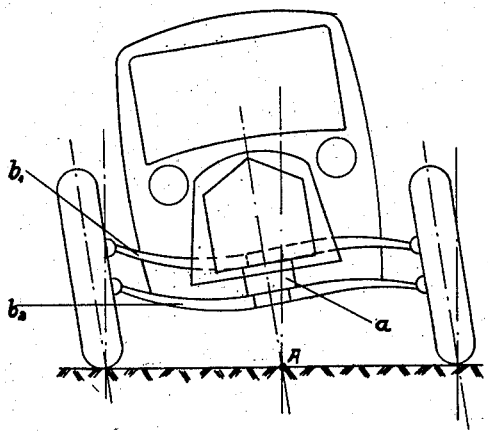
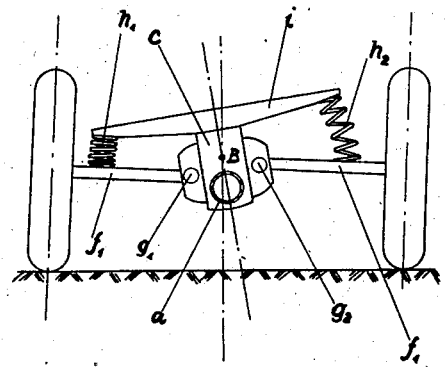
Inventor
Max Wagner Patented Oct. 1, 1935

2,015,700

UNITED STATES PATENT OFFICE 2,015,700

MOTOR VEHICLE

Max Wagner, Stuttgart, Germany, assignor to Daimler-Benz Aktiengesellschaft, Stuttgart-Unterturkheim, Germany, a company of Germany Application April 20, 1933, Serial No. 667,062
In Germany April 21, 1932

2 Claims. (Cl. 180—73)

This invention relates to motor vehicles and the object is to provide a construction which will improve the riding qualities of such vehicles, more particularly by providing for the decrease of the intensity of the transverse oscillations which take place when the vehicle is passing over a rough road or turning a corner at speed. In one aspect my invention may be considered as an improvement upon that disclosed in the patent to Devillers 1,915,649, June 27, 1933.

My invention may be well understood by reference to the following description of an illustrative embodiment thereof taken in connection with the accompanying drawing, wherein:—

Fig. 1 is a schematic longitudinal section through a vehicle;

Fig. 2 is a front elevation showing the manner in which the front wheels are mounted; and Fig. 3 is a simplified section on the line 3—3 of Fig. 1 illustrating the mounting of the rear wheels.

In Figs. 2 and 3 the car is shown in an inclined position such as it would occupy when swinging transversely.

Referring to the drawing, I have there shown a motor vehicle embodying a main underframe $a$, to be described more particularly hereinafter, having front and rear pairs of wheels, each wheel being independently connected to the underframe and spring-supported for individual movement. The front wheels are mounted in such manner that they may move in planes parallel to the central longitudinal plane of the vehicle. Thus in Fig. 2 I have illustrated each wheel as supported at the outer ends of two substantially parallel leaf springs $b_1$ and $b_2$ which operate substantially in the manner of a pair of parallel links guiding the wheel to move substantially parallel to itself and parallel to the central longitudinal plane of the vehicle. This language, which I have used as most quickly conveying the idea involved, is not quite accurate because, since the front wheels are turned in steering movement, it is not the wheel as a whole but the usual substantially vertical steering pivot (not illustrated) which moves in a plane parallel to the central plane, and here again the language may be slightly inaccurate on account of possible camber of the pivot, but the motion in question will be well understood by those skilled in the art aside from such niceties of expression.

The rear wheels, as best seen from Fig. 3, are mounted to permit angular swinging movement of their planes relative to the central plane of the vehicle, and herein the wheels are mounted on half axles $f_1$ and $f_2$ pivotally connected to the underframe, herein to the differential drive mechanism at $c$, by pivots $g_1$ and $g_2$ disposed outwardly of the central plane of the vehicle. Movement of the wheels is herein shown as controlled by the helical springs $h_1$ and $h_2$ interposed between the half axles and a cross-beam $i$ which is here shown as fixed to the differential housing.

By virtue of this arrangement of the wheels, if the car tends to tilt, the center of motion at the front wheels is a point A halfway between them and at the surface of the ground while the center of motion at the rear wheels is a point B at the height of the wheel centers corresponding to the center of motion about which they swing, and the axis of oscillation of the vehicle as a whole is defined by the line A—B inclining upwardly and rearwardly. The construction as so far described is essentially the same as that described in the Devillers Patent 1,915,649 above referred to, to which reference may be made for a fuller discussion.

It has been found in practice that even in the case of cars constructed as I have just described, although the center of gravity of the car body be situated quite near to the axis of oscillation and which cars therefore are statically balanced with respect to transverse oscillations, it may happen that under external shocks which cause the car body to tip a swinging movement of the car body about the axis of oscillation will take place, the intensity of which will increase with the distance of the chief masses of the car from the axis. The action of these masses may be compared to that of a fly-wheel with a relatively great radius of gyration and a correspondingly great force is required to damp the oscillation of the weights. In the preferred construction which I am about to describe this unsatisfactory condition is remedied not only by attaining conditions of static balance by the arrangement of the center of gravity of the car as a whole as near as possible to the axis of oscillation A—B, but also by locating each separate principal mass in such a manner that these masses are substantially centered about the axis and preferably in mutual balance. Thus not only is the lever arm of the forces of inertia, particularly centrifugal forces, which act on the car at its center of gravity, made small but also the radius of gyration and the moment of inertia of the masses which take part in the transverse oscillation are made small.

In the case of the car here shown by way of example the frame $a$, which may be considered one of the principal units of mass making up the car as a whole, is disposed substantially lower than the wheel centers and its center of gravity $s_2$ is thus brought closely adjacent the axis A—B, the frame considered as a unit being in substantial balance about such axis. Preferably this frame consists essentially of a single centrally and longitudinally disposed tube, as clearly seen from Fig. 3. This permits a low floor for the vehicle as a whole and a low positioning of the seats. The other principal unit of mass in the car is formed by the propelling mechanism, herein shown as comprising the engine or motor $e$ with its fly-wheel disposed in casing $d$, change speed gear mechanism and differential drive $c$. As seen from Fig. 1, this unit may be mounted centrally adjacent the rear wheels, being suitably fixed to the rear end of the tubular frame $a$. The center of gravity $s_1$ of this unit lies close to the axis A—B, herein substantially at the elevation of the centers of the rear wheels. Since the axis A—B inclines upwardly and rearwardly, the positioning of the heavy mass constituted by the propelling mechanism of the rear permits it to be organized in substantial equilibrium about this axis while an adequate room therefor above the road surface is available. The centers of gravity of the principal weights of the car, as $s_1$ and $s_2$, while individually lying closely adjacent the axis of oscillation A—B so that the moment of inertia, or in other words the radius of gyration of these weights relative to said axis, is reduced to a minimum, may be among themselves in substantial balance about the said axis so that the center of gravity $s$ of the vehicle as a whole approximates a point on the axis, as illustrated in Fig. 1.

I am aware that the invention may be embodied in other specific forms without departing from the spirit or essential attributes thereof. This is notably true as regards the spring suspension of the various wheels which might be effected by means different from those specifically described. I therefore desire the present embodiment to be considered in all respects as illustrative and not restrictive, reference being had to the appended claims rather than to the foregoing description to indicate the scope of the invention.

I claim:

1. A motor vehicle having front wheels suspended for movement bodily approximately parallel with the vertical medial plane of the body, and rear wheels suspended to move bodily about arcs the concave sides of which face said medial plane, whereby the axis of oscillation of the vehicle is an inclined line in said plane extending from within proximity of the ground at the front of the vehicle to within proximity of the normal axial line of the rear wheels; the principal masses of the vehicle, consisting of the vehicle frame considered as a unit and the vehicle engine and propelling mechanism considered as a unit, being positioned with their centers of gravity individually and as a system of masses in proximity of said axis of oscillation so as to secure in respect to these masses approximate static and dynamic balance of the vehicle; the engine and propelling mechanism being situated adjacent the normal axial line of the rear wheels.

2. A motor vehicle comprising an underframe consisting essentially of a centrally arranged longitudinal beam disposed below the wheel centers and having front wheels suspended for movement bodily approximately parallel with the vertical medial plane of the body, and rear wheels suspended to move bodily about arcs the concave sides of which face said medial plane, whereby the axis of oscillation of the vehicle is an inclined line in said plane extending from within proximity of the ground at the front of the vehicle to within proximity of the normal axial line of the rear wheels; the principal masses of the vehicle, consisting of the vehicle frame considered as a unit and the vehicle engine and propelling mechanism considered as a unit, being positioned with their centers of gravity individually and as a system of masses in proximity of said axis of oscillation so as to secure in respect to these masses approximate static and dynamic balance of the vehicle; the engine and propelling mechanism being situated adjacent the normal axial line of the rear wheels.

MAX WAGNER.